United States Patent [19]
Moro

[11] Patent Number: 5,995,245
[45] Date of Patent: Nov. 30, 1999

[54] IMAGE READER

[75] Inventor: Fuminori Moro, Toyokawa, Japan

[73] Assignee: Minolta Co., Ltd., Osaka, Japan

[21] Appl. No.: 08/956,298

[22] Filed: Oct. 22, 1997

[30] Foreign Application Priority Data

Oct. 25, 1996 [JP] Japan .................................. 8-283798
Apr. 25, 1997 [JP] Japan .................................. 9-108495

[51] Int. Cl.[6] .................................................. H04N 1/04
[52] U.S. Cl. .......................................... 358/474; 358/497
[58] Field of Search .................................. 358/497, 493, 358/474, 488, 486, 471, 464, 463; 250/208.1, 234–236

[56] References Cited

U.S. PATENT DOCUMENTS

| | | | |
|---|---|---|---|
| 5,084,611 | 1/1992 | Okisu et al. | 250/208.1 |
| 5,416,609 | 5/1995 | Matsuda et al. | 358/474 |
| 5,585,926 | 12/1996 | Fujii et al. | 358/471 |
| 5,677,776 | 10/1997 | Matsuda et al. | 358/475 |
| 5,706,050 | 1/1998 | Nishimura et al. | 358/516 |
| 5,764,379 | 6/1998 | Matsuda et al. | 358/488 |
| 5,764,380 | 6/1998 | Noguchi | 358/488 |
| 5,764,383 | 6/1998 | Saund et al. | 358/488 |
| 5,831,750 | 11/1998 | Okisu et al. | 358/475 |

*Primary Examiner*—Edward L. Coles
*Assistant Examiner*—Cheukfan Lee
*Attorney, Agent, or Firm*—Sidley & Austin

[57] ABSTRACT

The present invention pertains to a book scanner that reads the image of an document such as a book or magazine while it is placed open and face up, and more particularly, to an image reader that detects the height distribution of the document prior to performing a pre-scanning to detect the size of the document and the background luminance of the document. Thus, a focal length adjustment is performed in response to the detected height distribution while the pre-scanning takes place in order to prevent defocusing caused by the curvature of the document consisting of an open book or magazine. The book reader also reads the book in at least two spectral regions to detect and eliminate image anomalies.

23 Claims, 10 Drawing Sheets ns of focus. A book scanner measures the curved condition
IMAGE READER

BACKGROUND OF THE INVENTION

1. Field of the Invention

The present invention pertains to an image reader suitable for reading a bound document, such as a book or magazine.

2. Description of the Related Art

Image readers, called book scanners, have already been commercialized. In these devices, an image sensing unit is arranged above a document table, so as to provide an open space several tens of centimeters in height between the document table and the image sensing unit. When reading a bound document (hereinafter referred to as "book document") such as a bound document file or magazine, a user places the open book document on the document table so that the document surface is facing upward. When the start key is pressed, an illumination lamp is turned ON, and prescanning is executed. Operation settings are set based on the information obtained by the prescanning, and thereafter a main scanning is executed. In the main scanning, the image read is sequentially output to an external device. If the external device is a printer, a copy image is formed on a real-time. The efficiency of multi-page reading operations is increased because the pages of a book document disposed on document table can be turned when using a book scanner. Furthermore, damage to scanned documents is greatly reduced compared arrangements requiring face-down orientation of open book documents. In the following discussion, book documents include filed documents.

Unlike a single sheet document, the document surface (i.e., the surface to be read) of a book document is curved. In other words, depending on the position along the bilateral direction on the book, the height of the document varies. Due to this height differential, distortion occurs in the read image in accordance with the state of curvature and unsharpness of focus. A book scanner measures the curved condition (the height distribution of the surface of the document), and carries out focus adjustment and distortion correction depending on the result of the measurement. For the method to measure the curved condition of the document surface, a method in which the image of an edge surface, which is the part of the book called the 'head', is taken and image analysis is performed (U.S. Pat. No. 5,585,926), as well as a slit-light projection method used in three-dimensional measurement (U.S. Pat. No. 5,084,611) are available.

In pre-scanning, in addition to the measurement of height distribution, the density of the background of the document, the size of the document and the positions of the user's hands that hold the document to maintain the curved condition are also measured. Measurement of the background density is necessary to set the density of the output image, measurement of the document size is necessary for the purpose of automatic paper selection (APS) and automatic magnification selection (AMS). Depending on the positions of the hands, the range of masking so as to eliminate the images of the hands from the read image is set.

However, in a conventional book scanner, the problem arises that where the curvature of the surface of the document is large, there are areas that go out of focus during pre-scanning, so that the accuracy of measurement during pre-scanning regarding the condition of the document, including the background density and size, decreases and the reading operation parameter settings become inappropriate.

In addition, in a conventional book scanner, because the background density, the size of the document, and the height distribution of the document are all measured based on the information taken from an optical image of one wavelength distribution, the measurement accuracy is not optimal for all measured parameters.

SUMMARY OF THE INVENTION

The object of the present invention is to provide an image reader that is capable of performing appropriate reading even where the differences in the height of the document are large. Another object of the present invention is to more easily ensure measurement accuracy where two or more information parameters pertaining to the document are measured through pre-scanning.

In order to attain the objects described above, the image reader of the present invention first comprises the following components:

an image reading means that converts an optical image into electronic image data;

an optical system that projects the image of the document onto the image reading device;

means that measures the height distribution of the surface of the document, i.e., the object of reading, before pre-scanning;

a focal length adjusting means that performs focal length adjustment for the image projection by the optical system based on the result of the height distribution measurement;

an document condition measuring means that measures the condition of an document based on the image data that is output by the image reading means after the optical image as to which focal length adjustment has been performed is read during pre-scanning; and a reading control means that causes reading of the document to be performed based on the results of the measurements pertaining to the condition of the document and the height distribution of the surface of the document.

The image reader of the present invention secondly comprises the following components:

an image reading means that converts a two-dimensional optical image into electronic image data by means of a line sensor and a sub-scanning mechanism;

an optical system that projects the image of the document onto said line sensor;

a means that projects the optical image of an edge surface of an open book document that extends parallel to the bilateral direction of the book onto the line sensor;

a means that measures the height distribution of the surface of the document based on the image of the edge surface that is obtained by the image reading means;

a focal length adjusting means to perform focal length adjustment for the projection by the optical system based on the result of the height distribution measurement; and a scanning control means that causes said image reading means to carry out two pre-scannings, wherein, during the first pre-scanning, the optical image of the edge surface is taken and the height distribution of the surface of the document is measured while the focal length is fixed, and wherein, during the second pre-scanning, the image of the document is read while the focal length is adjusted as the second scanning progresses by means of the sub-scanning mechanism, in response to the result of the height distribution measurement performed during the first pre-scanning.

The image reader of the present invention thirdly comprises the following components:

an image reading means that converts an optical image into electronic image data;

an optical system that projects the image of the document onto the image reading means;

an optical device to project optical images having different wavelength distributions onto the image reading means;

a scanning control means that causes the image reading means to perform two pre-scannings; and a pre-scanning control means that changes the operation parameters of said optical device between the first pre-scanning and the second pre-scanning, such that the wavelength distribution of the optical image projected onto the image reading device will change.

The image reader of the present invention is fourthly the third image reader that also has:

a mechanism to perform focal length adjustment for the projection by the optical system;

a means that measures the height distribution of the surface of the document, i.e., the object of reading, in the first or second pre-scanning; and a means that causes the mechanism to perform focal length adjustment for the main scanning that follows the second pre-scanning, based on the result of the height distribution measurement.

The image reader of the present invention is fifthly the third image reader that also has:

a mechanism to perform focal length adjustment for the projection by the optical system;

a means that measures the height distribution of the surface of the document, i.e., the object of reading, in the first pre-scanning; and a means that causes the mechanism to perform focal length adjustment for the second pre-scanning and the subsequent main scanning.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
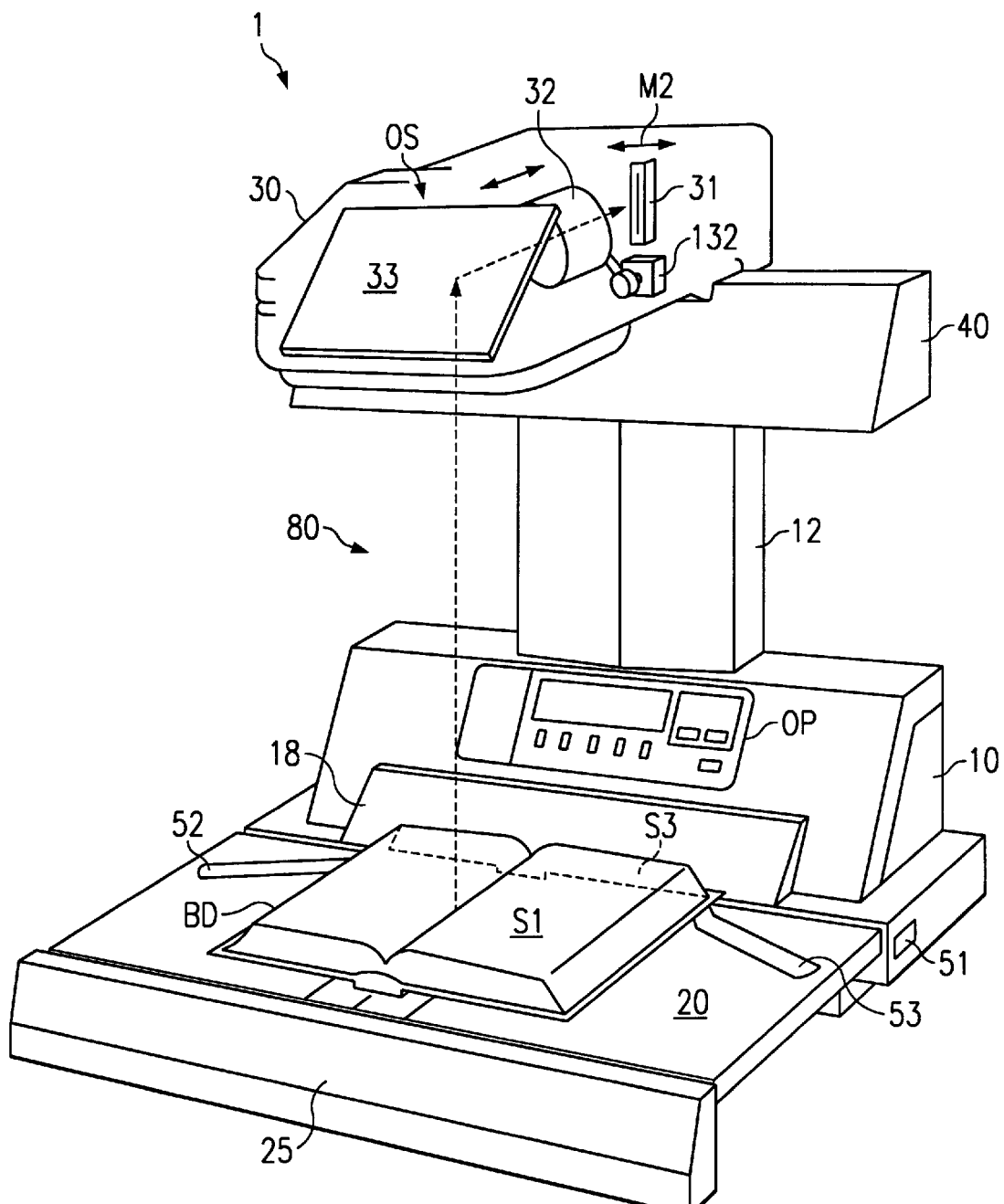
FIG. 1 is a perspective view showing an exterior view of a first book scanner.
Figure 2A:
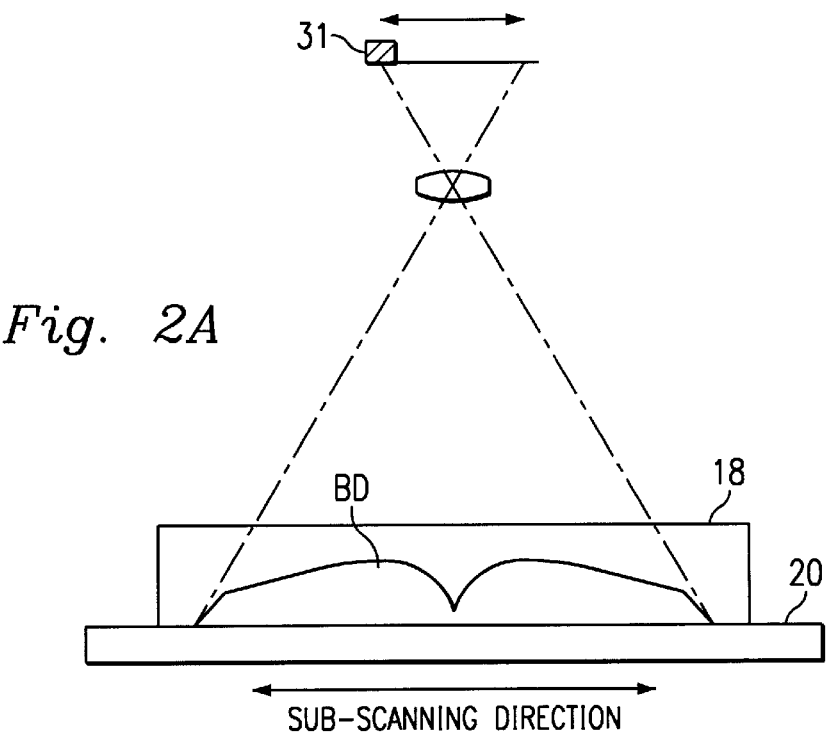
FIGS. 2(a)–2(b) are simplified drawings regarding the manner in which reading is performed by the book scanner.
Figure 2B:
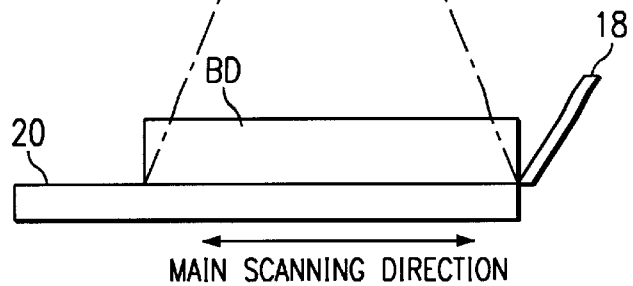
Figure 3:
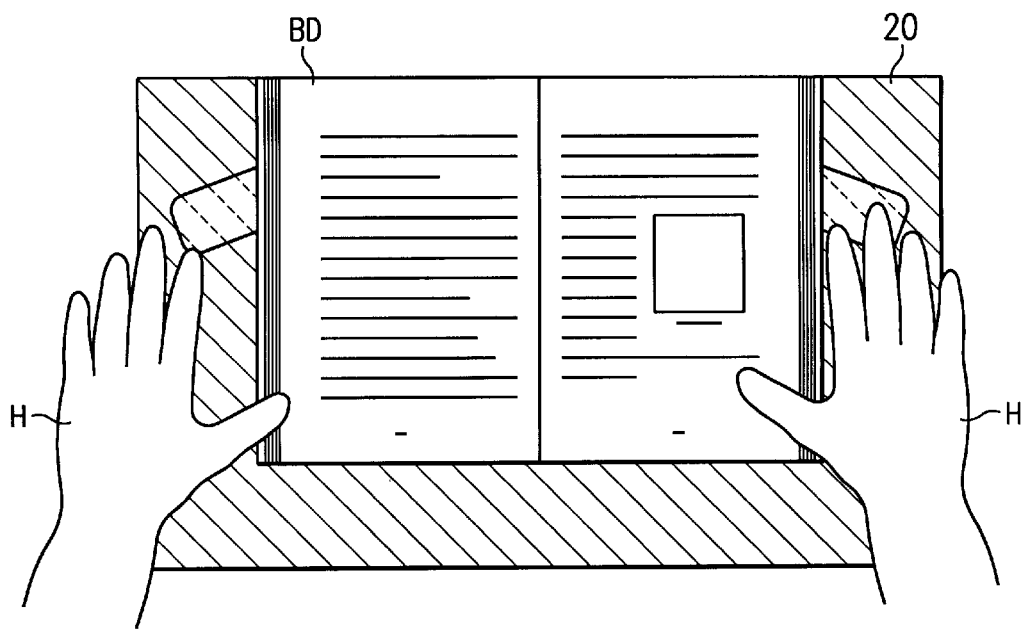
FIG. 3 is a plan view showing one example of the setting condition.

FIG. 1 is a perspective view showing an exterior view of first book scanner 1. FIG. 2 is a simplified drawing showing the manner in which reading is performed by book scanner 1. FIG. 3 is a plan view showing one example of the setting condition.

Book scanner 1 is an image reader suitable for the reading of a book document (open book document), comprising main unit housing 10 that houses electric circuits, etc., dark-colored document table 20 on which the document is placed, image reading unit 30 that converts the image of the document into electric signals, and lamp unit 40 that illuminates the document. Document table 20 is mounted to the front surface side of main unit housing 10. Image reading unit 30 is mounted above document table 20 and is supported on one side by support pillar 12 that extends upward from the upper surface of main unit housing 10. Lamp unit 40 is fixed to support pillar 12 at a position below image reading unit 30. Space 80 between document table 20 and image reading unit 30 is open to the free space outside the device and is large enough to accommodate placement of a book document. The distance between document table 20 and the lower surface of image reading unit 30 is 30 cm or more.

Operation panel OP that includes a liquid crystal display is mounted on the upper half of the front surface of main unit housing 10, and reflector 18 to detect the height of the surface of the document is fixed to the lower half. The front surface of reflector 18 is glossy and is tilted at a 45° angle relative to the top surface of document table 20. The image of edge surface S3 in a direction perpendicular to the lateral direction of a book document BD is reflected in reflector 18, and the condition of said reflection in reflector 18 is read together with the document image.

Main switch 51 is mounted on the right side surface of main unit housing 10 relative to operation panel OP when facing said operation panel. Start keys 52 and 53 are respectively provided on bilateral side of document table 20 to allow users to start a reading operation, and an arm rest 25 is provided at the front side.

In FIG. 1, image reading unit 30 has line sensor 31 comprising a CCD array, image-forming lens 32 and mirror 33. The document image is projected onto the light receiving surface of line sensor 31 by means of optical system OS comprising mirror 33 and image-forming lens 32. Image-forming lens 32 is constructed so as to be movable in front-to-back directions, and is positioned by an autofocus mechanism (lens drive unit) 132. Line sensor 31 is attached to a movable body of a scanning mechanism not shown in the drawing, so as to be movable horizontally along the lateral direction (subscanning direction) M2 while the direction of the array of the CCD elements are maintained in a vertical direction. A two-dimensional reading of a document image is accomplished by the aforesaid horizontal movement. That is, in book scanner 1, a two-dimensional image sensing plane is formed by the movement of line sensor 31. When an area sensor is used instead of line sensor 31, the photoreceptor surface of said area sensor becomes the image sensing plane. The main scanning direction of the document image is the front-to-back direction document table 20, and the vertical direction on the image on the image sensing plane.

When using book scanner 1, the user places book document BD on document table 20 with the pages facing upward such that the open pages will be aligned parallel to the bilateral direction of document table 20, as shown in FIG. 1. When doing so, the user aligns the border between the right and left pages with the center of document table 20 in terms of its bilateral direction and places book document BD against the lower edge of reflector 18 in order to determine the front-rear position for book document BD. The border between reflector 18 and document table 20 works as the reference line for the setting of the document. In addition, the user holds either end of book document BD if necessary in order to keep it open, as shown in FIG. 3. In the case of a sheet document, the document may be set in any orientation. Document table 20 is supported by means of a spring mechanism such that it will move down depending on the weight of the document. By means of this mechanism, the distance between document surface S1 and mirror 33 is kept within a certain range regardless of the thickness of book document BD.

Figure 4:
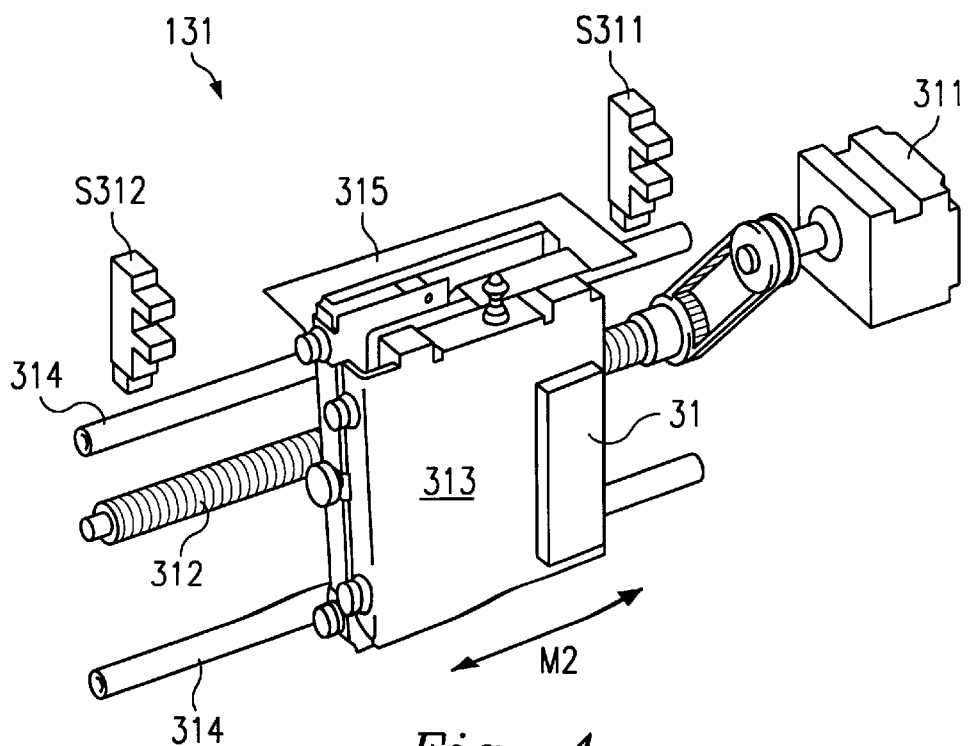
FIG. 4 is a drawing showing the construction of a sub-scanning mechanism.

FIG. 4 is a drawing showing the construction of sub-scanning mechanism 131.

Sub-scanning mechanism 131 is a motor-powered screw-based sliding mechanism, and comprises such components as motor 311, driving screw 312, scanner 313 and guide rail 314. Line sensor 31 is mounted to scanner 313. In order to detect the position of scanner 313, photointerrupters S311 and S312 are mounted as position sensors at either end of movement directions M2, and light shield 315 is mounted to scanner 313.

Figure 5:
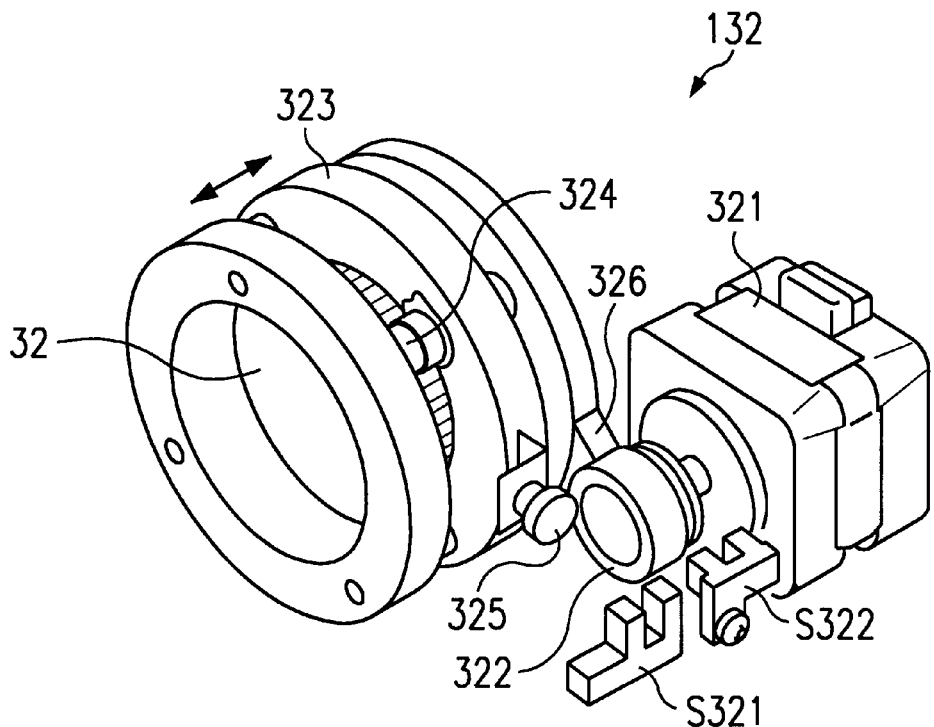
FIG. 5 is a drawing showing the construction of an AF mechanism.

FIG. 5 is a drawing showing the construction of AF mechanism 132.

AF mechanism 132 is a motor-powered cam-based sliding mechanism, and comprises such components as motor 321, cylindrical cam 322, ring slider 323, guide rail 324 and follower 325. As cam 322 rotates, slider 323 that engages with cam 322 via follower 325 moves horizontally. Image-forming lens 32 is mounted in slider 323. In order to detect the rotation angle position of cam 322 that corresponds to the position of slider 323, photointerrupters S321 and S322 are mounted as position sensors near cam 322 and light shield 326 is mounted to cam 322.

Book scanner 1 has three reading modes in which different numbers of scannings are performed. The first mode is appropriate for sheet documents. In the first mode, only one scanning (main scanning) is performed. The second scanning mode is a mode in which one pre-scanning is performed before a main scanning. The third mode is a mode that is unique to the present invention, in which two pre-scannings are performed.

Figure 6:
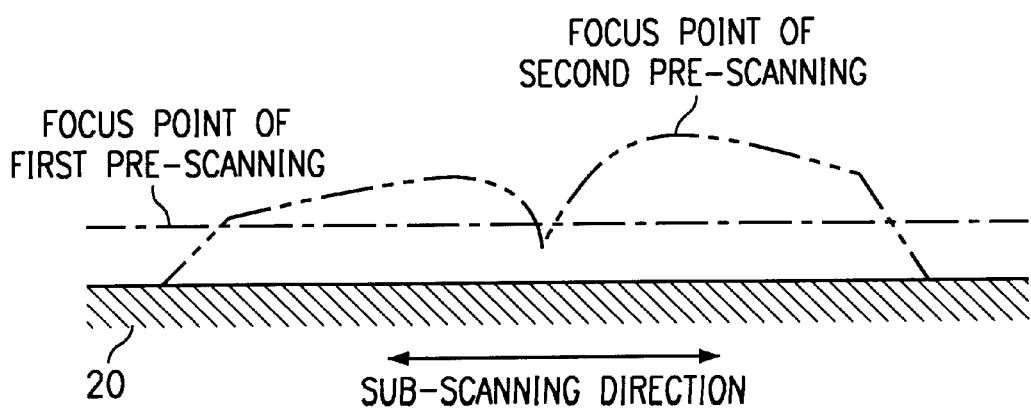
FIG. 6 is a simplified drawing regarding the focal length adjustment operation during pre-scanning.

FIG. 6 is a simplified drawing regarding focus adjustment during pre-scanning.

Since document surface S1 of book document BD is curved, unlike a sheet document, it is necessary to carry out focus adjustment for image reading in response to this curved condition. Correction of image distortion and a process to compensate for the difference in luminance are also necessary. Therefore, in the second and third modes referred to above, a pre-scanning is performed to detect the curved condition of document surface SI. In addition, during an additional pre-scanning (the second pre-scanning in the third mode), the size of the document and the luminance of the background density of document surface S1 are also measured. Operation parameters for the main scanning are set based on the results of these measurements.

During pre-scanning in the second mode and the first pre-scanning in the third mode, because the height of the document is unknown, the image of the document is read while fixing the focal length regarding a point located at a certain height (several millimeters, for example), as shown in FIG. 6. In the second pre-scanning in the third mode and the main scanning in the second and third modes, as the sub-scanning progresses, focus adjustment is performed, in which image-forming lens 32 is moved in response to the result of the measurement of the curved condition of document surface S1. Image output to an external device takes place during the main scanning.

Figure 7A:
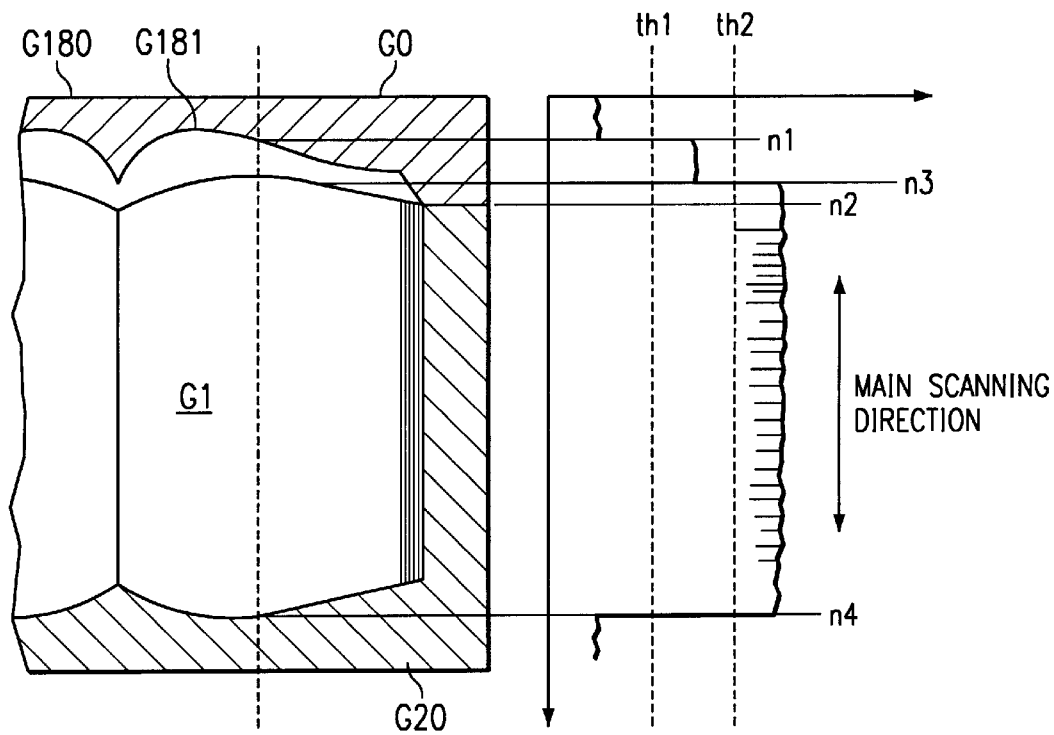
FIGS. 7A and 7B are drawings to explain the method to measure the curved condition of the surface of the document.
Figure 7B:
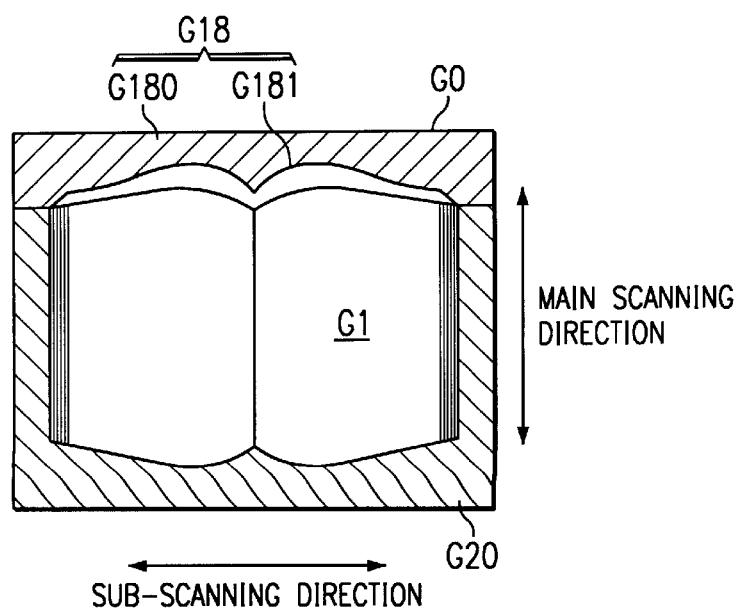

FIGS. 7A and 7B are drawings to explain the method of measurement regarding the curved condition of the surface of the document. The dotted line in FIG. 7A indicates the position of a line that is being measured.

Read image G0 consists of image G1 taken of the upper surface of book document BD (upper surface image), image G20 taken of document table 20, and image G18 taken of reflector 18. Image G181 in image G18 indicates the configuration of an edge surface (the surface called "head" in a book") S3 of book document BD that is placed on the document table 20. Image 180 in image G18, i.e., the image other than image of the background reflected on reflector 18.

Because document table 20 is dark-colored as indicated above, image G20 is darker than other images. Background image G180 is also darker than edge surface image G181. Therefore, upper surface image G1 and edge surface image G181 may be extracted via determination regarding the level of luminance. Specifically, the luminance (pixel value) is checked sequentially starting with the first pixel of each line along the main scanning direction, and pixel position (pixel number) n1 of the first pixel in the range that exceeds first threshold level th1 in luminance and pixel positions n3 and n4 of the first and last pixels of the range that exceeds second threshold th2 (th2>th1) in luminance are detected. The number of pixels between pixel position n1 and known pixel position n2 that corresponds to the front edge of reflector 18 corresponds to the height of document surface S1 for a given line, and the number of pixels between pixel position n3 and pixel position n4 corresponds to the size of the document along the main scanning direction. The actual dimensions are determined through computation to divide the number of pixels by the image reading resolution. The curved condition of document surface S1, i.e., the height distribution, is specified by the aggregate of data indicating the height of document surface S1 at each line. In addition, the first line and last line from which pixel positions n3 and n4 are detected correspond to either end of the document along the sub-scanning direction.

The upper and lower edges of upper surface image G1 are curved in read image G0 because the height of document surface S1 is not constant. In other words, an object close to the image reading plane is read as being larger than an object that is farther away. During main scanning, image processing is performed in which the curved upper surface image G1 is corrected into an image that would be obtained if the height of document surface S1 were constant (image distortion correction). Specifically, regarding the main scanning direction, a plane that is a certain distance above document table 20 (5 cm, for example) is deemed a reference plane, and upper surface image G1 is magnified depending on the difference in terms of vertical position between the reference plane and document surface S1 at each point along the sub-scanning direction. Regarding the sub-scanning direction, upper surface image G1 is magnified in accordance with the ratio of the length per increment on document surface S1 along the bilateral direction to the length of the same increment that is projected on document table 20.

Figure 8:
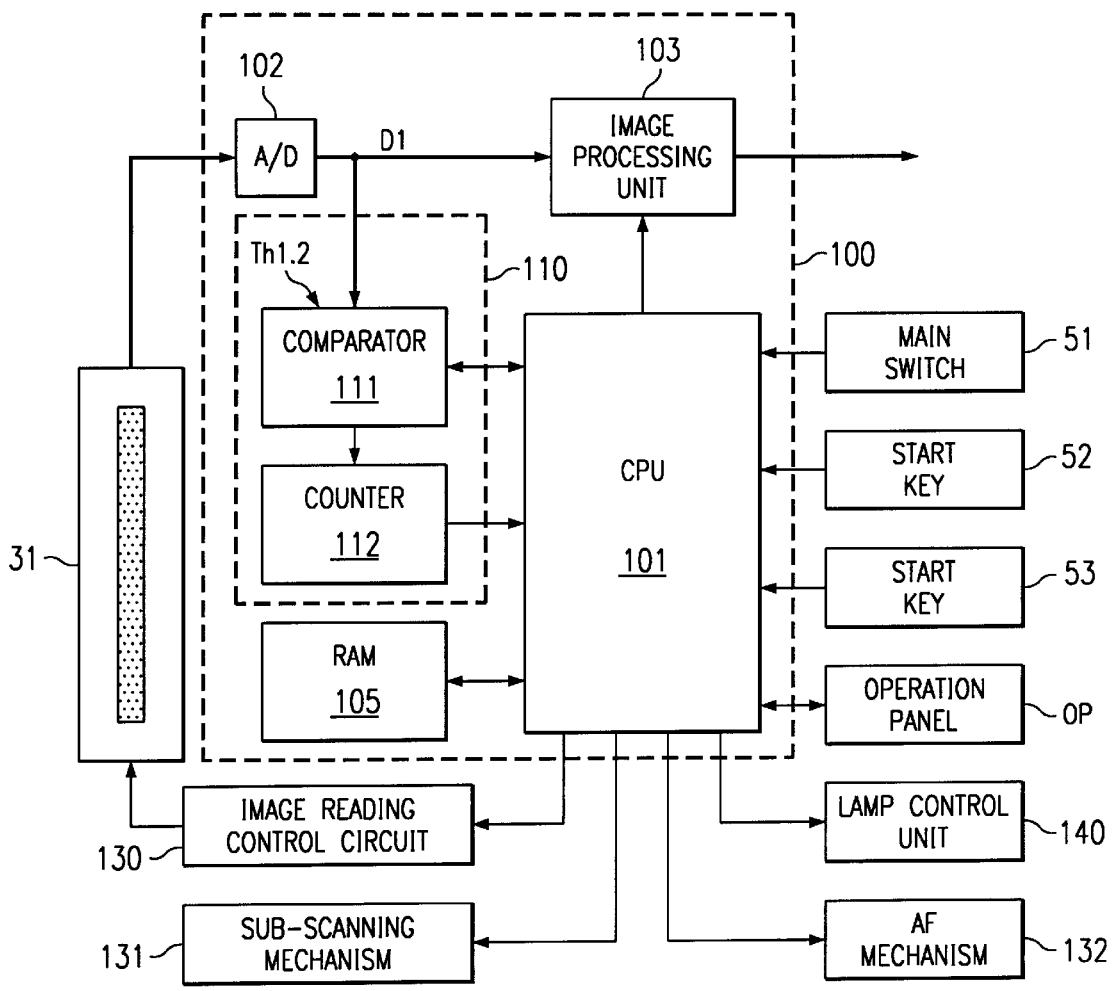
FIG. 8 is a block diagram regarding the signal processing system of the book scanner.

FIG. 8 is a block diagram for signal processing system 100 of book scanner 1.

Signal processing system 100 has CPU 101, A/D converter 102, image processing unit 103, RAM 105 and height measuring unit 110.

In pre-scanning, the photoelectric conversion signal output from line sensor 31 is converted into 8-bit image data D1, for example, by A/D converter 102 and input to height measuring unit 110 in the order of the alignment of the pixels. Height measuring unit 110 comprises comparator 111 and counter 112. Comparator 111 compares image data D1 that is input and threshold values th1 and th2, and sends the result of the comparison to CPU 101 and counter 112. Counter 112 counts the number of pixels having a luminance that exceeds threshold value th1. In other words, the height of document surface S1 is measured. CPU 101 takes in the count value by counter 112 and generates height data DH that indicates the curved condition of document surface S1. Height data DH is stored in RAM 105 once. CPU 101 also takes in pixel positions n3 and n4 that are detected by comparator 111 in pre-scanning in the second mode and the second pre-scanning in the third mode and generates size data DS that indicates the plan view size of the document. It also takes in image data D1 that is input to comparator 111 and seeks the background density by generating a luminance histogram. In addition, it determines the positions of unwanted images, such as the images of the user's hands, from the luminance distribution.

After completion of the pre-scanning(s), CPU 101 performs setting regarding various image processing routines including image distortion correction, density adjustment and correction of unevenness in luminance, as well as the output image range (effective reading range) based on the measurement data including height data DH and size data DS, in preparation for the main scanning.

In the main scanning, the output from line sensor 31 is converted into 8-bit image data, for example, by A/D converter 102 and input to image processing unit 103. Image processing unit 103 carries out such processes as correction of unevenness in luminance regarding document surface S1, MTF correction to improve the image quality, magnification including correction of image distortion caused by the curvature of document surface S1, correction regarding density, and masking to make areas outside output image range blank. The image data that has undergone prescribed image processing routines is output to an external device. For the external device, a printer, display, image memory or image editing system (computer system) may be used.

CPU 101 also controls driving systems including image reading control circuit 130, sub-scanning mechanism 131, AF mechanism 132 and lamp control unit 140, and gives prescribed instructions (operation commands) to each object of control. Operation panel OP and various switches are connected to CPU 101. RAM 105 is a work area for the execution of programs by CPU 101 and is used to temporarily store various control data.

Figure 9:
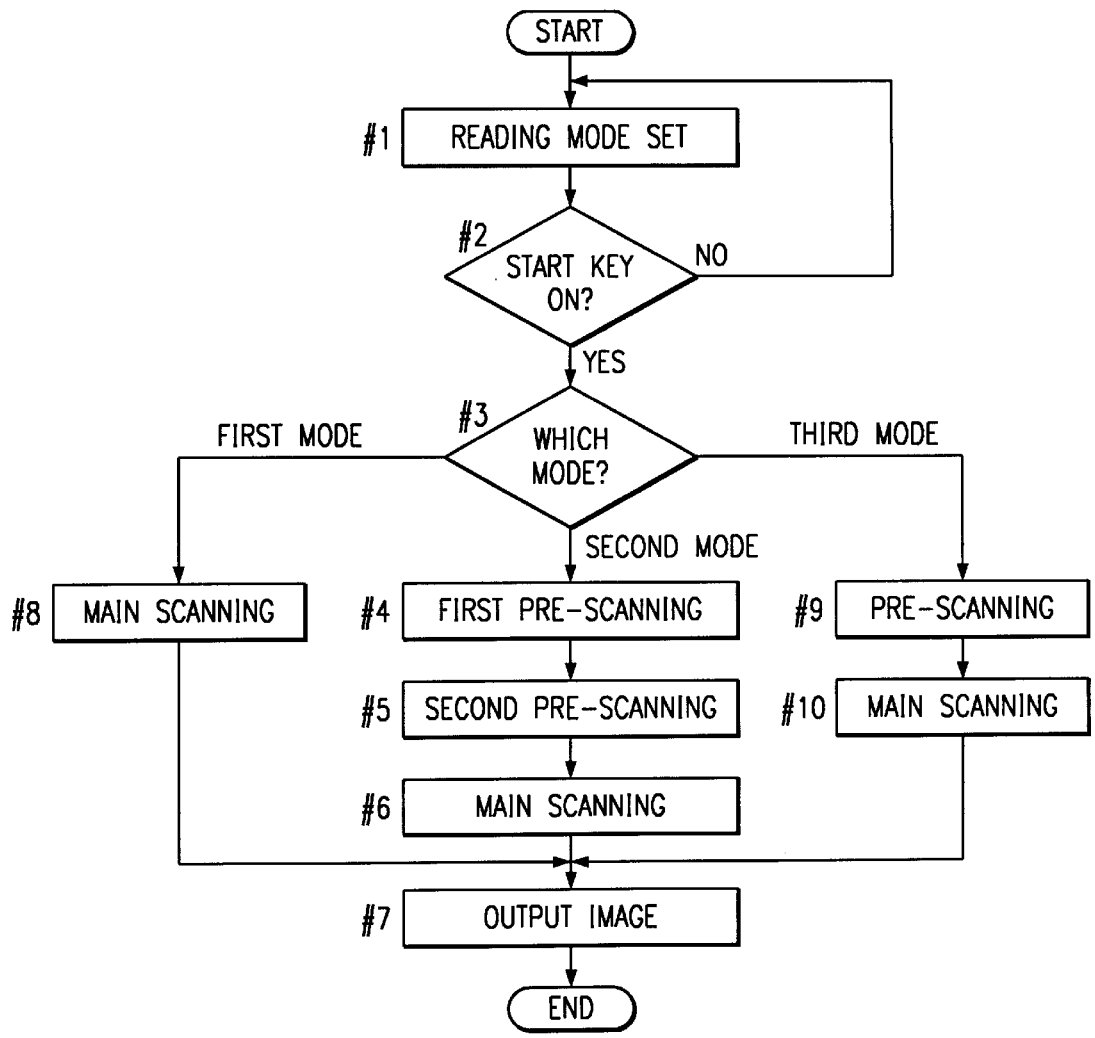
FIG. 9 is a flow chart showing the outline of the operation of the book scanner.

FIG. 9 is a flow chart showing the outline of the operation of book scanner 1.

Reading mode is set in response to the operation to designate a mode (#1). When the image of book document BD is to be read, the user selects either a mode in which both the right and left pages are read together or a mode in which the right and left pages are read individually (book divide mode), in addition to the selection pertaining to the first through third modes described above.

When either of start keys 52 and 53 is turned ON (#2), CPU 101 checks the setting for the number of scannings, i.e., which of the first through third modes is selected (#3). Where the first mode is selected, in which the number of scannings is set at one, only a main scanning is performed (#8). Where the second mode is selected, in which the number of scannings is set at two, a pre-scanning (#9) and main scanning (#10) are sequentially performed. Where the third mode is selected, in which the number of scannings is set at three, is selected, a first pre-scanning (#4), second pre-scanning (#5), and main scanning (#6) are sequentially performed. In any of these cases, the image read during the main scanning is output to an external device (#7).

In the embodiment described above, the performance of sub-scanning is not limited to line sensor 31 that is moved horizontally, but may instead be performed by a rotating mechanism that deflects incident light, for example. For the purpose of focus adjustment, only line sensor 31 or line sensor 31 together with image-forming lens 32 may be moved along the optical axis. If the scanning speed for the first or the first and second pre-scannings is made higher than that for the main scanning, the image reading time may be shortened. The scanning speed may be varied depending on the magnification used in the image reading. The data processing time may be reduced by limiting the signals read from line sensor 31 to signals that correspond to image G18 for reflector 18 during the first pre-scanning in the third mode. It is also acceptable for measurement for the height distribution and all other measurement items carried out in the first pre-scanning and the second pre-scanning to be omitted if the difference in height regarding document surface S1 is equal to or smaller than a prescribed value.

Figure 10:
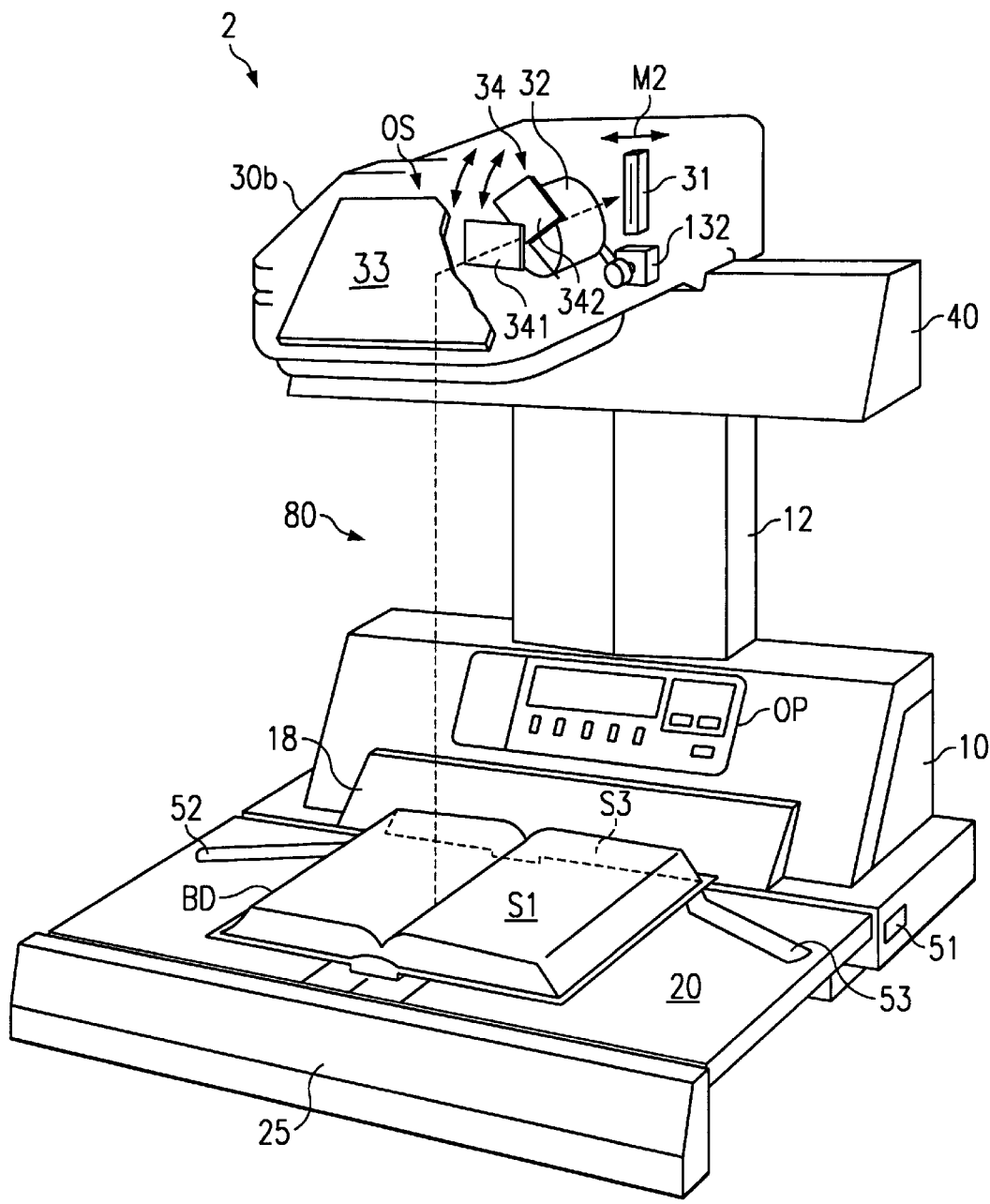
FIG. 10 is a perspective view showing an exterior view of a second book scanner.

FIG. 10 is a perspective view showing an exterior view of second book scanner 2. In this drawing, components that are the same as those shown in FIG. 1 are given the same numbers, and their explanation is omitted or simplified.

Book scanner 2 comprises main unit housing 10, document table 20, image reading unit 30b, and lamp unit 40, and its exterior view is identical to that of book scanner 1 described above. A halogen lamp that for its light emission has a wavelength band that ranges from the visible range to the infrared range is incorporated into lamp unit 40 as a light source. Line sensor 31, image-forming lens 32, mirror 33 and filter mechanism 34 that works as an optical device for the present invention are housed inside image reading unit 30b placed above document table 20. Line sensor 31 responds to visible light and infrared light and outputs a photoelectric conversion signal corresponding to the amounts of light in these wavelength ranges. Image-forming lens 32 can move back and forth, and is positioned by means of AF mechanism 132 (see FIG. 5). Filter mechanism 34 has visible light-shielding filter 341 and infrared light-shielding filter 342. It inserts either one of these filters in the light path between mirror 33 and line sensor 31 and retracts the other from said light path. It may retract both filters from the light path as well. Filter mechanism 34 is placed between mirror 33 and image-forming lens 32 in the drawing, but it is also possible to place it between image-forming lens 32 and line sensor 31. From among the light traveling toward line sensor 31 from document surface S1 and reflector 18, light having a wavelength in the visible range or the infrared range selectively strikes line sensor 31. In other words, the spectral characteristics for the image reading changes by means of filter mechanism 34.

Figure 11:
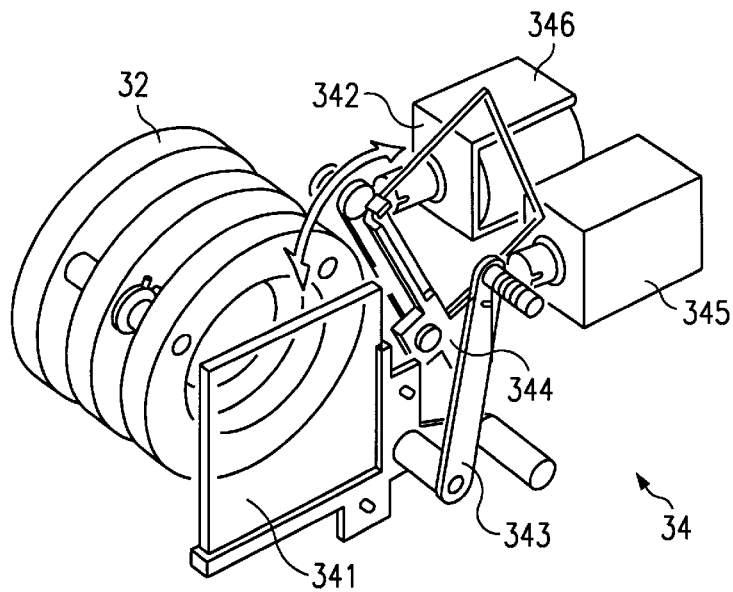
FIG. 11 is a drawing showing the construction of a filter mechanism.

FIG. 11 is a drawing showing the construction of filter mechanism 34.

Filter mechanism 34 is of a rotary type and comprises link member 343 that supports visible light-shielding filter 341, link member 344 that supports infrared light-shielding filter 342 and two solenoids 345 and 346. As solenoids 345 and 346 turn ON or OFF, link members 343 and 344 that are connected to a rotatable iron core (rod) respectively rotate such that the filters are positioned appropriately.

Book scanner 2 has an image reading mode in which two pre-scannings are performed before the main scanning. The height distribution of document surface S1, the size of the document, the positions of the user's hands and the background density of document surface S1 are measured based on the image of the document that is obtained through these pre-scannings. The measurement of the height distribution is based on the determination of the configuration of edge surface image G1, as explained with reference to FIGS. 7A and 7B. Since book scanner 2 is normally used indoors, objects other than edge surface S3 are often reflected on reflector 18. If a fluorescent lamp illuminating the room or the user's white clothing as illuminated by said lamp are reflected in particular, edge surface image G1 becomes distorted due to the influence of flickering originating from the commercial frequency, and errors in height measurement occur. Therefore, for the measurement of height distribution, visible light-shielding filter 341 is selectively inserted in the light path and the image of reflector 18 is then taken.

In other words, the optical image that includes infrared light components among the illuminating light is read. Since a fluorescent lamp emits little light in the infrared range, the influence of flickering can be reduced by shielding the visible light. On the other hand, visible light is suited for measurement pertaining to the positions of the user's hands and the background density of document surface S1. If infrared light is included, the red image is read as a whitish image and measurement of the background density thus becomes inaccurate. When using infrared light only, errors easily occur due to the influence of heat from the user's hands or due to the presence of an image on either the book side of the scanned document page or on the next sheet that is visible through the scanned document page. Therefore, for the measurement regarding the positions of the hands and the background density, infrared light-shielding filter 342 is selectively inserted in the light path and the image of reflector 18 is taken. For the measurement of the size of the document, either visible light or infrared light may be used.

The order of pre-scanning in which visible light-shielding filter 341 is used and pre-scanning in which infrared light-shielding filter 342 is used does not matter: Either one may be performed first. However, if the height distribution is measured in the first pre-scanning, focus adjustment that accommodates the height distribution should be performed during the second pre-scanning, so that measurement pertaining to the positions of the hands, etc., is carried out based on precise image information.

Figure 12:
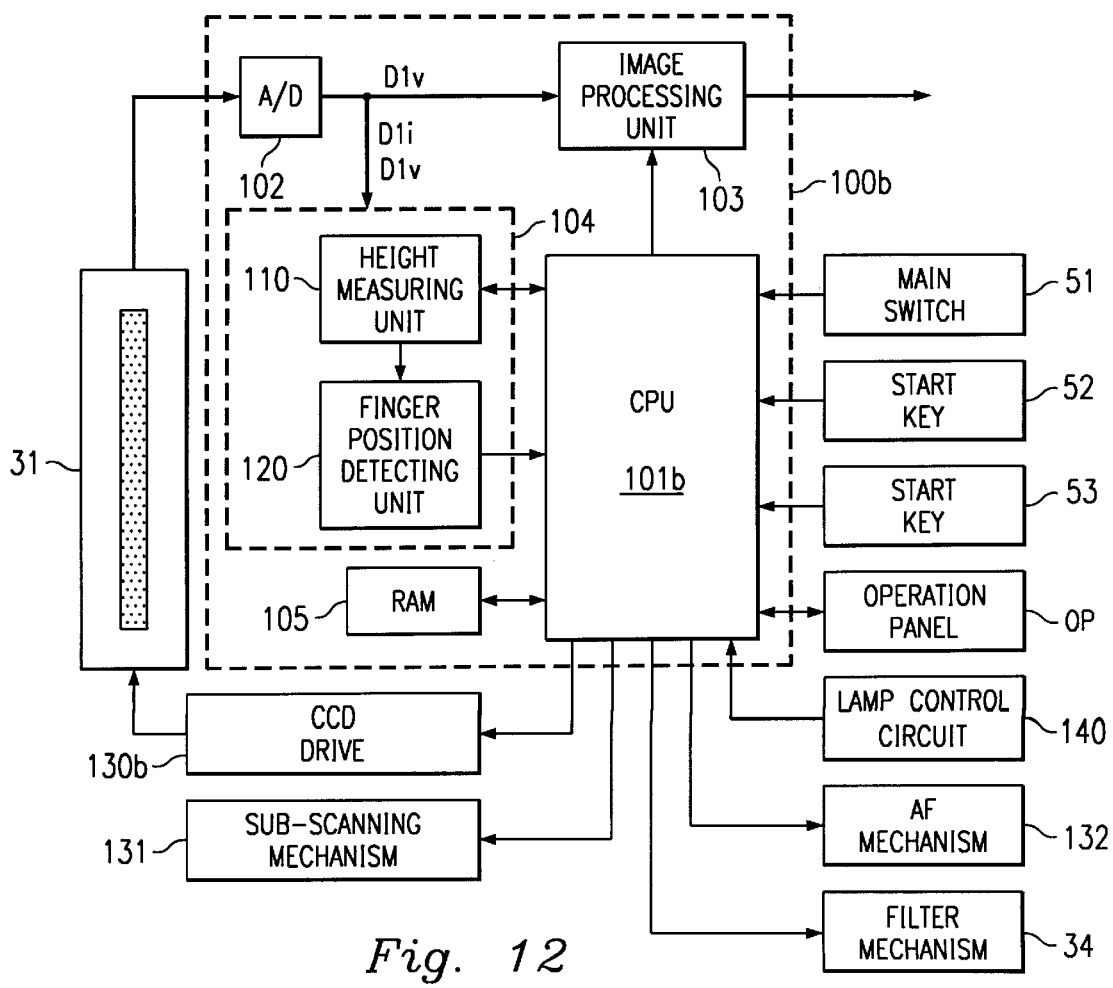
FIG. 12 is a block diagram regarding the functions of important components of the book scanner.

FIG. 12 is a block diagram regarding the functions of important components of book scanner 2.

Book scanner 2 is controlled by CPU 101*b* equipped with a microcomputer. CPU 101*b* gives operational instructions to objects of control including CCD drive circuit 130*b* that provides a clock to line sensor 31, sub-scanning mechanism 131, AF mechanism 132, lamp control circuit 140, image processing unit 103 and filter mechanism 34. For example, regarding filter mechanism 34, CPU 101*b* controls the turning ON and OFF of solenoids 345 and 346 such that visible light-shielding filter 341 and infrared light-shielding filter 342 may be positioned appropriately. Operation panel OP, group of switches 50 and various sensors are also connected to CPU 101*b*. CPU 101*b* is also a component of signal processing system 100*b* that processes the image data.

Signal processing system 100*b* has measuring circuit 104 that comprises height measuring unit 110 and finger position detecting unit 120. Image data D1*i* for infrared light image obtained in image reading using visible light-shielding filter 341, for example, is input to measuring circuit 104 during the first pre-scanning. Height measuring unit 110 measures the height of document surface S1 by comparing image data D1*i* and threshold value th1 (see FIGS. 7A and 7B). During the second pre-scanning, image data D1*v* for a visible light image obtained in image reading using infrared light-shielding filter 342, for example, is input to measuring circuit 104. Measurement regarding prescribed items (the positions of the user's hands, background density) are performed by finger position detecting unit 120, for example, based on this image data D1*v*. CPU 101*b* generates control data for AF mechanism 132 and image processing circuit 103 based on the output from measuring circuit 104.

Figure 13:
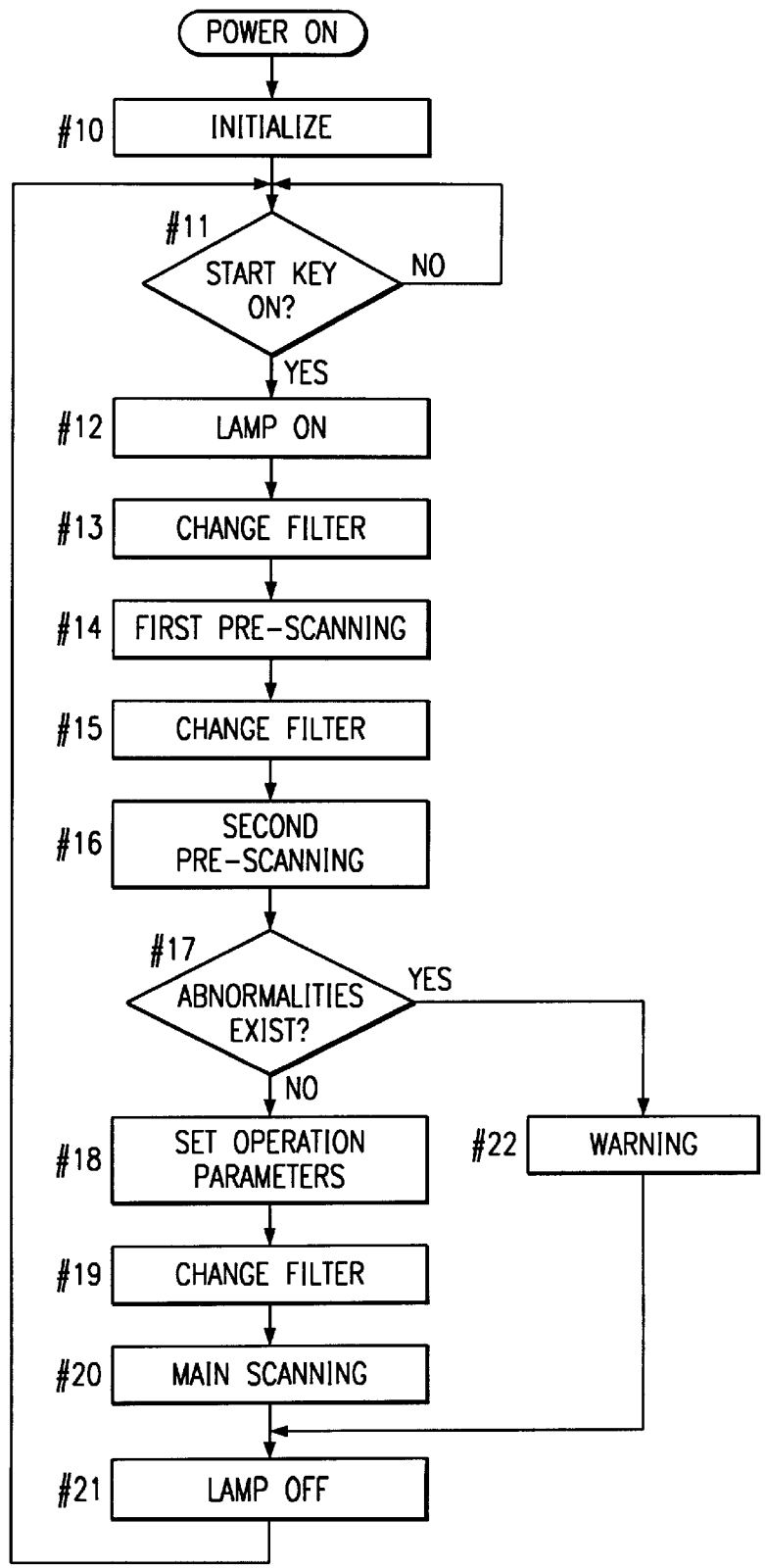
FIG. 13 is a flow chart showing an outline of the operation of the book scanner.

FIG. 13 is a flow chart showing an outline of the operation of book scanner 2.

When power is turned ON via the operation of main switch 51, operation parameters are initialized (#10), and CPU 101*b* waits for the next operation. When either one of start keys 52 and 53 is turned ON (#11), CPU 101*b* turns ON the illumination lamp (#12) and inserts the filter (infrared light-shielding filter 341 or visible light-shielding filter 342) that is appropriate for the item of measurement performed during the first pre-scanning in the light path (#13). CPU 101*b* then performs the first pre-scanning (#14). It then switches the filters (#15) and performs the second pre-scanning (#16).

CPU 101*b* checks for presence of abnormalities in the measurement data obtained in the two pre-scannings. (#17) If there is any abnormality, CPU 101*b* executes a warning routine to display a message to that effect (#22), turns OFF the illumination lamp and waits for the next instruction (#21). If there is no abnormality, it sets operation parameters for the main scanning after calculating AF control data (the amount to move the lens) and distortion correction coefficient (magnification) based on the height data (#18). CPU 101*b* then switches the filters and executes the main scanning (#19, #20). In the main scanning, focus adjustment is carried out as scanning progresses along the sub-scanning direction while image processing routines, including distortion correction and masking, are sequentially performed on the image data that is obtained. When the output of image data for the last line of the designated range is completed, CPU 101*b* turns OFF the illumination lamp and enters a standby state. Checking of the measurement data may be performed before the commencement of the secondary pre-scanning or while the second pre-scanning takes place. The same filter that is used in the second pre-scanning may be used in the main scanning. In that case, filter switching in step #19 may be omitted. Both infrared light-shielding filter 341 and visible light-shielding filter 342 may be retracted away from the light path when the main scanning is performed.

Figure 14:
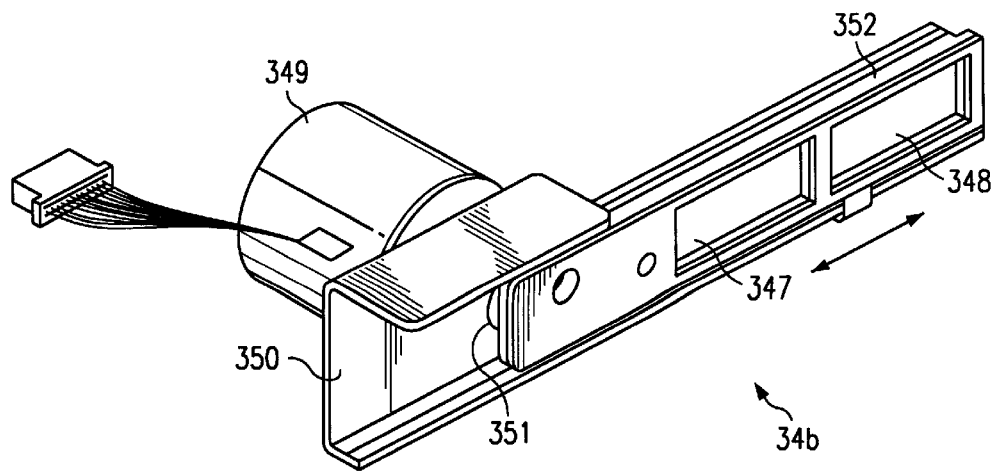
FIG. 14 is a drawing showing the construction of another filter mechanism.

FIG. 14 is a drawing showing the construction of another filter mechanism 346.

This filter mechanism 34b is of a sliding type. First and second filters 347 and 348 are mounted side by side to movable frame 352. Movable frame 352 moves horizontally along the alignment of the filters while being guided by fixed frame 350. Motor 349 is connected to fixed frame 350 as a drive source, and pinion 351 that is mounted to the shaft of motor 349 is engaged with rack 352 that is mounted to movable frame 352. For the positioning of the filters, such methods as feedback control using an optical or mechanical position sensor or pulse control by means of the motor are used.

In the embodiment described above, the spectral characteristics for image reading are changed by switching filters between one pre-scanning and another, but it is also acceptable if one of multiple light sources having different wavelength distributions in their light emission are selectively turned ON such that an optical image having a wavelength distribution suited for the current measurement item may be projected onto line sensor 31.

Embodiments in which book document BD was placed face up were shown as examples, but it is also acceptable to apply the invention of claim 1 in an image reader in which book document BD is placed face down. The height distribution may be measured using a slit-light projection method or by means of multiple distance measuring sensors, for example, without performing scanning of the document.

In the present invention, after the height distribution of the surface of the document is measured, a pre-scanning of the image of the document is performed in order to measure prescribed items regarding the condition of the document, and focal length adjustment (focusing) for the reading of the image of the document is carried out during said pre-scanning based on the result of the measurement regarding the height distribution. This increases the accuracy of measurement during pre-scanning. Where the image reading system is used for measurement of the height distribution, i.e., where the image taken of the edge surface of the document that is open or the image taken of the surface of the document to which slit-light is projected is analyzed, for example, two pre-scannings are to be performed. Where the image taken of the edge surface is used, the height distribution measurement operation may be repeated based on the image taken in the second pre-scanning for which focus adjustment was made.

The spectral characteristics for the image reading are changed between the first pre-scanning and the second pre-scanning, such that measurement is made based on image information having a wavelength distribution that is appropriate for each of the multiple measurement items. For example, infrared light image reading and visible light image reading take place. The changing of spectral characteristics can be made by switching light-separating filters or illuminating light sources.

Therefore, using the present invention, high quality images may be output through appropriate image reading operations. In addition, even where the difference in height of the surface of the document is large, an appropriate image reading operation may be performed so that a high quality image may be output. Further, where multiple items of information pertaining to the document are measured through prescanning, accuracy in measurement is easily ensured.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An image reader for reading a document placed on a document table, said image reader comprising:

an image reading device for reading a document and for outputting image data;

a scanning control means for executing a first pre-scanning, a second pre-scanning and a main scanning;

a first condition detecting means for detecting a first condition of the document based on image data of the document obtained by the image reading device during the first pre-scanning;

a first image reading correcting means for correcting a reading of a document based said detected first condition;

a second condition detecting means, responsive to the first image reading correcting means, for detecting a second condition of the document based on image data of the document obtained by the image reading device during the second pre-scanning, said image data of the document obtained by the image reading device during the second pre-scanning being corrected by said first image reading correcting means based on said detected first condition; and a second image reading correcting means for correcting a reading of a document based on said detected second condition;

wherein image data of the document obtained by the image reading device during the main scanning is corrected by said second image reading correcting means based on said detected second condition, said first condition being different than said second condition.

2. An image reader in accordance with claim 1, wherein said first condition detected during the first pre-scanning is a document height distribution.

3. An image reader in accordance with claim 2, wherein a scanning speed for at least one of the first and second pre-scannings is higher than a scanning speed for the main scanning.

4. An image reader for reading a document placed on a document table in a face upward condition, said image reader comprising:

an image reading device for reading a document and for outputting image data;

an optical device for projecting an image of the document onto the image reading device;

a height detecting device for detecting a height distribution of a surface of the document before pre-scanning;

a focus adjusting device for adjusting a focus of the image projected onto the image reading device by said optical device based on the detected height distribution; and a document condition detecting device for detecting a condition of the document based on image data from the image reading device read during pre-scanning, said image data read during pre-scanning being read while said focus adjusting device adjusts a focus of the image projected onto the image reading device based of the detected height distribution.

5. An image reader in accordance with claim 4, further comprising:
a reading operating device for executing a reading operation based on the detected condition of the document and the detected height distribution of the surface of the document.

6. An image reader in accordance with claim 5, wherein said detected condition is a size of the document.

7. An image reader in accordance with claim 4, wherein said detected condition is a luminance of background of the document surface.

8. An image reader for reading a document placed on a document table in a face upward condition, said image reader comprising:
a line sensor which scans a two-dimensional image to generate electronic image data;
an optical device for projecting the image of the document surface and the image of an edge surface of document onto said line sensor;
a scanning control device for executing a first pre-scanning, a second pre-scanning, and a main scanning;
a height detecting device for detecting a height distribution of the surface of the document based on the image of said edge surface that is obtained by said line sensor during the first pre-scanning;
a focus adjusting device for adjusting a focus of the image projected onto the line sensor by said optical device based on the detected height distribution;
a document condition detecting device for detecting a condition of the document, other than said height distribution, based on image data output by the line sensor during the second pre-scanning;
a reading control device for controlling reading by the line sensor during the main scanning;
wherein, during the first pre-scanning, the image of the edge surface is read and the height distribution of the surface of the document is detected by means of reading the edge surface under a condition of a fixed focal length,
wherein, during the second pre-scanning, the image of the document surface is read and the condition of the document is detected while the focus is adjusted in response to the height distribution detected during the first pre-scanning, and
wherein, during the main scanning, the image of the document surface is read based on the condition detected during the second pre-scanning.

9. An image reader in accordance with claim 8, wherein said document condition is a size of the document.

10. An image reader in accordance with claim 8, wherein said document condition is a luminance of background of the document surface.

11. An image reader in accordance with claim 8, further comprising a filter mechanism for selectively positioning first and second optical filters in an optical path between said optical device and said line sensor.

12. An image reader in accordance with claim 11, wherein said filter mechanism selectively positions said first optical filter in said optical path during the first pre-scanning and wherein said filter mechanism selectively positions said second optical filter in said optical path during the second pre-scanning.

13. An image reader in accordance with claim 12, wherein said first optical filter is a visible light-shielding filter and said second optical filter is an infrared light-shielding filter.

14. An image reader for reading a document placed on a document table in a face upward condition, said image reader comprising:
an image reading device for reading the document and for outputting image data;
an optical device for projecting an image of the document surface onto said image reading device;
an optical control device for selectably controlling a wavelength distribution of the image projected onto said image reading device;
a scanning control device for executing a first pre-scanning, a second pre-scanning, and a main scanning; and
a height detecting device for detecting a height distribution of the surface of the document based on the image that is obtained by said line sensor during the first pre-scanning;
wherein, during the first pre-scanning, the optical control device controls a wavelength distribution of the image projected onto the image reading device to an infrared wavelength distribution.

15. An image reader in accordance with claim 14, further comprising:
a document condition detecting device for detecting a condition of the document based on the image data output by the image reading device during the second pre-scanning.

16. An image reader in accordance with claim 15, wherein said document condition is a size of the document.

17. An image reader in accordance with claim 15, wherein said document condition is a luminance of background of the document surface.

18. An image reader in accordance with claim 15, further comprising:
a focus adjusting device for adjusting a focus of the image projected onto the line sensor by the optical device based on the detected height distribution;
wherein, during the first pre-scanning, the image of the document is read and the height distribution of the surface of the document is detected under a condition of a fixed focal length;
wherein, during the second pre-scanning, the image of the document surface is read and the condition of the document is detected while the focus is adjusted in response to the height distribution detected during the first pre-scanning; and
wherein, during the second pre-scanning, the optical control device controls a wavelength distribution of the image projected onto the image reading device to a visible wavelength distribution.

19. A three mode image reader for reading a document placed on a document table in a face upward condition, comprising:
a line sensor which scans a two-dimensional image to generate electronic image data;
an optical device for projecting the image of the document surface and the image of an edge surface of document onto said line sensor;
a mode selection device for selecting one of first, second or third modes;
a scanning control device, responsive to said mode selection device, for executing at least one of a first pre-scanning, a second pre-scanning, and a main scanning;

a height detecting device for detecting a height distribution of the surface of the document based on the image of said edge surface that is obtained by said line sensor during the first pre-scanning;

a focus adjusting device for adjusting a focus of the image projected onto the line sensor by said optical device based on the detected height distribution;

a document condition detecting device for detecting a condition of the document based on image data output by the line sensor during the second pre-scanning; and a reading control device for controlling reading by the line sensor during the main scanning;

wherein in the first mode only the main scanning is executed, in the second mode the first pre-scanning and the main scanning are executed, and in the third mode the first pre-scanning, the second pre-scanning and the main scanning are executed;

wherein, during the first pre-scanning, the image of the edge surface is read and the height distribution of the surface of the document is detected by means of reading the edge surface under a condition of a fixed focal length, wherein, during the second pre-scanning, the image of the document surface is read and the condition of the document is detected while the focus is adjusted in response to the height distribution detected during the first pre-scanning, and wherein, for the second and third modes, during the main scanning, the image of the document surface is read based on at least one of the height distribution detected during the first pre-scanning and the condition detected during the second pre-scanning.

20. An image reader in accordance with claim 19, further comprising a filter mechanism for selectively positioning first and second optical filters in an optical path between said optical device and said line sensor.

21. An image reader in accordance with claim 20, wherein said filter mechanism selectively positions said first optical filter in said optical path during the first pre-scanning, said filter mechanism selectively positions said second optical filter in said optical path during the second pre-scanning, and wherein said first optical filter is a visible light-shielding filter and said second optical filter is an infrared light-shielding filter.

22. A method of processing an image of a document placed on a document table in a face upward condition, the method comprising the steps of:

projecting an image of the document onto a image reading device;

detecting a height distribution of a surface of the document before pre-scanning;

adjusting a focus of the image projected onto the image reading device based on the detected height distribution;

detecting a condition of the document based on image data from the image reading device read during pre-scanning, said image data read during pre-scanning being read while said step of adjusting a focus based on the detected height distribution; and reading the document with the image reading device and outputting image data based on the detected height distribution and the detected condition of the document.

23. A method of processing an image of a document placed on a document table in a face upward condition, the method comprising the steps of:

reading a document and outputting image data by a line sensor;

projecting the image of the document surface and the image of an edge surface of document onto said line sensor;

executing a first pre-scanning wherein the image of the edge surface is read and the height distribution of the surface of the document is detected while the focal length is fixed;

executing a second pre-scanning wherein the image of the document surface is read and a condition of the document, other than the height distribution, is detected while the focus is adjusted in response to the height distribution detected during the first pre-scanning; and executing a main scanning wherein the image of the document surface is read based on the condition detected during the second pre-scanning.

* * * * *